United States Patent
Bavois

(10) Patent No.: US 10,326,265 B2
(45) Date of Patent: Jun. 18, 2019

(54) METHOD FOR LIMITING THE CURRENT IN DEVICES OF "H-BRIDGE" TYPE

(71) Applicants: Continental Automotive France, Toulouse (FR); Continental Automotive GmbH, Hannover (FR)

(72) Inventor: Thierry Bavois, Toulouse (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 0 days.

(21) Appl. No.: 15/765,131

(22) PCT Filed: Aug. 26, 2016

(86) PCT No.: PCT/EP2016/001441
§ 371 (c)(1),
(2) Date: Mar. 30, 2018

(87) PCT Pub. No.: WO2017/059939
PCT Pub. Date: Apr. 13, 2017

(65) Prior Publication Data
US 2018/0294634 A1 Oct. 11, 2018

(30) Foreign Application Priority Data
Oct. 7, 2015 (FR) .................................. 15 59538

(51) Int. Cl.
*H02H 3/08* (2006.01)
*H02H 7/08* (2006.01)
(Continued)

(52) U.S. Cl.
CPC ............ *H02H 3/08* (2013.01); *H02H 1/0007* (2013.01); *H02H 5/047* (2013.01);
(Continued)

(58) Field of Classification Search
CPC ........... H02H 3/08; H02H 3/087; H02H 9/025
(Continued)

(56) References Cited

U.S. PATENT DOCUMENTS 5,111,378 A    5/1992  Nowak et al.
5,642,247 A *  6/1997  Giordano ............. H02H 7/0838
                                                 318/434
(Continued)

FOREIGN PATENT DOCUMENTS

CN    201846068 U    5/2011
CN    202373968 U    8/2012
(Continued)

OTHER PUBLICATIONS

International Search Report and Written Opinion for International Application No. PCT/EP2016/001441, dated Oct. 11, 2016, 7 pages.
(Continued)

*Primary Examiner* — Dharti H Patel
(74) *Attorney, Agent, or Firm* — RatnerPrestia

(57) ABSTRACT

A method for limiting the current in a device of "H-bridge" type having a plurality of transistors including the following steps: detection of a failure in a transistor from among the plurality of transistors; disabling of the transistor in which a failure has been detected; detection in the transistors opposite to the transistor, of the discharging of the energy accumulated at output; and disabling of the other transistors of the plurality of transistors. A system for limiting the current in a device of "H-bridge" type having a plurality of transistors is also disclosed.

11 Claims, 2 Drawing Sheets

(51) Int. Cl.
*H02H 1/00* (2006.01)
*H02H 5/04* (2006.01)
*H02H 7/122* (2006.01)
*H02M 1/32* (2007.01)

(52) U.S. Cl.
CPC ........ *H02H 7/0838* (2013.01); *H02H 7/1225* (2013.01); *H02M 1/32* (2013.01); *H02M 2001/327* (2013.01)

(58) Field of Classification Search
USPC ........................................................ 361/101
See application file for complete search history.

(56) References Cited

U.S. PATENT DOCUMENTS

| | | | | |
|---|---|---|---|---|
| 7,457,136 | B2* | 11/2008 | Ozaki | H02H 7/1227 363/17 |
| 9,245,540 | B1* | 1/2016 | Agness | G11B 5/5565 |
| 9,417,983 | B2* | 8/2016 | Metzner | G06F 11/3027 |
| 9,568,560 | B2* | 2/2017 | Pasqualetto | G01R 31/40 |
| 2004/0257737 | A1 | 12/2004 | Lepage | |
| 2008/0253047 | A1* | 10/2008 | Takihara | H03K 17/0822 361/57 |
| 2010/0097737 | A1* | 4/2010 | Hirata | H02H 7/0816 361/101 |
| 2011/0096581 | A1 | 4/2011 | Hallak | |
| 2013/0083434 | A1 | 4/2013 | Barth | |
| 2014/0028233 | A1 | 1/2014 | Lee | |
| 2014/0028234 | A1 | 1/2014 | Lee et al. | |
| 2014/0077736 | A1 | 3/2014 | Donner et al. | |

FOREIGN PATENT DOCUMENTS

| | | |
|---|---|---|
| CN | 103872998 A | 6/2014 |
| DE | 4024160 A1 | 2/1991 |
| EP | 1467462 A1 | 10/2004 |
| EP | 2112051 A1 | 10/2009 |
| KR | 101353102 B1 | 1/2014 |
| KR | 101353234 B1 | 1/2014 |
| WO | 03077322 A2 | 9/2003 |
| WO | 2009156230 A2 | 12/2009 |

OTHER PUBLICATIONS

English translation of the Written Opinion for International Application No. PCT/EP2016/001441, dated Oct. 11, 2016, 5 pages.

* cited by examiner

METHOD FOR LIMITING THE CURRENT IN DEVICES OF "H-BRIDGE" TYPE

CROSS REFERENCE TO RELATED APPLICATIONS

This application is the U.S. National Phase Application of PCT International Application No. PCT/EP2016/001441, filed Aug. 26, 2016, which claims priority to French Patent Application No. 1559538, filed Oct. 7, 2015, the contents of such applications being incorporated by reference herein.

FIELD OF THE INVENTION

The present invention relates to the field of electronics.

The present invention has particularly advantageous applications in the field of electronics for motor vehicles, and in particular in the field of 'H-bridge' devices and power drivers.

BACKGROUND OF THE INVENTION

In 'H-bridge' circuits, protective measures are implemented against currents having an excessively high magnitude, termed 'overcurrents', for each of the power transistors.

When a transistor detects a high stress phenomenon, termed 'overstress', all of the transistors are turned off at the same time.

FIG. 2 illustrates a system according to the prior art. It is seen in FIG. 2 that, in the event of detection of a current having an excessively high magnitude, termed 'overcurrent', all of the transistors are turned off at the same time.

In the case of an inductive load, this involves a phase of discharging through a freewheeling diode to ground and to the positive power supply.

The inductive discharge phase in the freewheeling diodes brings about a substrate injection into the electronic circuits and means that expensive semiconductor processes have to be implemented to resist this.

The inductive discharge phase in the freewheeling diodes also brings about, on the 'high side' (that is to say on the side linked to the supply voltage), an increase in the supply voltage. This means that the decoupling capacitances, and therefore the cost, have to be increased.

SUMMARY OF THE INVENTION

An aspect of the present invention aims to mitigate the drawbacks of the prior art by proposing a method that makes it possible to eliminate, or in any case to very greatly reduce, freewheeling diode injection in the event of detection of a current having an excessively high magnitude, termed 'overcurrent', or of detection of 'thermal shutdown' phenomena, that is to say switching off due to excessive temperature.

To this end, an aspect of the present invention relates, in its broadest sense, to a method for limiting the current in an 'H-bridge' device including a plurality of transistors, which method is noteworthy in that it includes the following steps:
  Detecting a failure on one transistor from among said plurality of transistors;
  Turning off said transistor on which a failure has been detected;
  Detecting, on the transistors opposite said transistor, the discharge of the accumulated output power; and
  Turning off the other transistors of said plurality of transistors.

Thus, the method according to an aspect of the present invention makes it possible to eliminate or very greatly reduce freewheeling diode injection in the event of detection of a current having an excessively high magnitude, termed 'overcurrent', or of a thermal phenomenon, termed 'thermal shutdown'.

The method according to an aspect of the present invention makes it possible to implement a semiconductor process with low immunity to substrate injection.

The method according to an aspect of the present invention also makes it possible to reduce phenomena, termed 'overshoot', of the supply voltage, and therefore to reduce the decoupling capacitances.

The method according to an aspect of the present invention also makes it possible to reduce the size of the freewheeling diodes.

According to one embodiment, said failure is linked to a current having an excessively high magnitude, termed 'overcurrent'.

According to one embodiment, said failure is linked to a thermal phenomenon.

According to one embodiment, said detection, on the transistors opposite said transistor, of the discharge of the accumulated output power is performed by a current detector on the opposite transistors.

According to one embodiment, said detection, on the transistors opposite said transistor, of the discharge of the accumulated output power is performed by a voltage detector on the opposite transistors.

An aspect of the present invention also relates to a system for limiting the current in an 'H-bridge' device including a plurality of transistors, which system is noteworthy in that it includes means for:
  Detecting a failure on one transistor from among said plurality of transistors;
  Turning off said transistor on which a failure has been detected;
  Detecting, on the transistors opposite said transistor, the discharge of the accumulated output power; and
  Turning off the other transistors of said plurality of transistors.

BRIEF DESCRIPTION OF THE DRAWINGS

Aspects of the invention will be better understood with the aid of the description, given hereinafter purely by way of explanation, of one embodiment of the invention, with reference to the figures, in which.

DETAILED DESCRIPTION OF THE PREFERRED EMBODIMENTS

Figure 1:
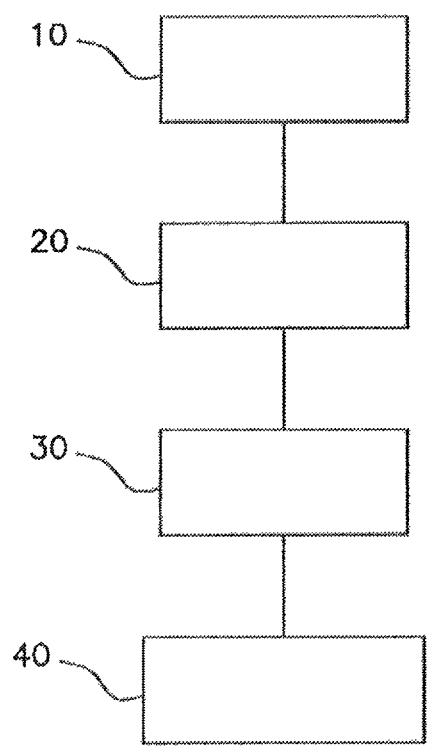
FIG. 1 illustrates the method according to the present invention in one embodiment.

FIG. 1 illustrates the method according to an aspect of the present invention in one embodiment.

The present invention, as illustrated in FIG. 1, relates to a method for limiting the current in an 'H-bridge' device including a plurality of transistors T1, T2, T3, T4, including the following steps:
  Detecting 10 a failure on one transistor T from among said plurality of transistors T1, T2, T3, T4;
  Turning off 20 said transistor T on which a failure has been detected;

Detecting 30, on the transistors opposite said transistor T, the discharge of the accumulated output power; and Turning off 40 the other transistors of said plurality of transistors T1, T2, T3, T4.

In one embodiment, the failure is linked to a current having an excessively high magnitude, termed 'overcurrent'.

In one embodiment, the failure is linked to a thermal phenomenon.

In one embodiment, the detection, on the transistors opposite said transistor T, of the discharge of the accumulated output power is performed by a current detector on the opposite transistors.

In one embodiment, the detection, on the transistors opposite said transistor T, of the discharge of the accumulated output power is performed by a voltage detector on the opposite transistors.

An aspect of the present invention also relates to a system for limiting the current in an 'H-bridge' device including a plurality of transistors T1, T2, T3, T4. This system includes means for:

Detecting a failure on one transistor T from among said plurality of transistors T1, T2, T3, T4;

Turning off said transistor T on which a failure has been detected;

Detecting, on the transistors opposite said transistor T, the discharge of the accumulated output power; and Turning off the other transistors of said plurality of transistors T1, T2, T3, T4.

A description is given hereinafter of one exemplary embodiment of the present invention. Consideration is given to a device including four transistors T1, T2, T3 and T4. If a current having an excessively high magnitude is detected in the transistor T1, the transistor T1 is turned off, but the transistors T2, T3 and T4 are not turned off. To this end, detection is awaited, on the transistors opposite the transistor T1, of the discharge of the accumulated output power. It is only at this moment that the other transistors are turned off, in contrast to the prior art solutions. This method is similar if a current having an excessively high magnitude is detected in the transistor T2, T3 or T4.

Figure 2:
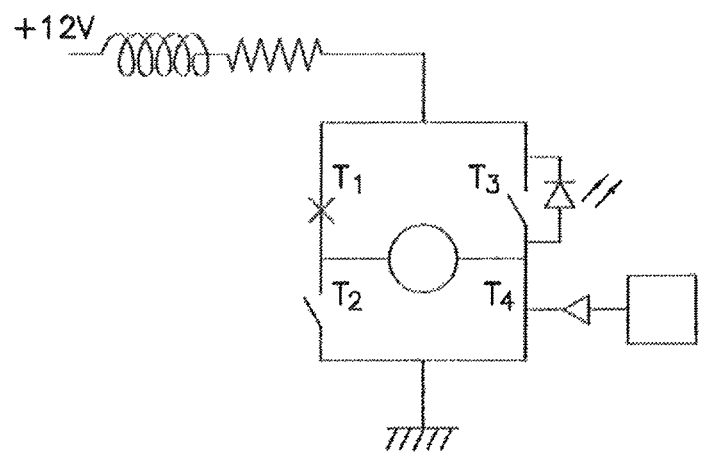
FIG. 2 illustrates a system according to the prior art.
Figure 3:
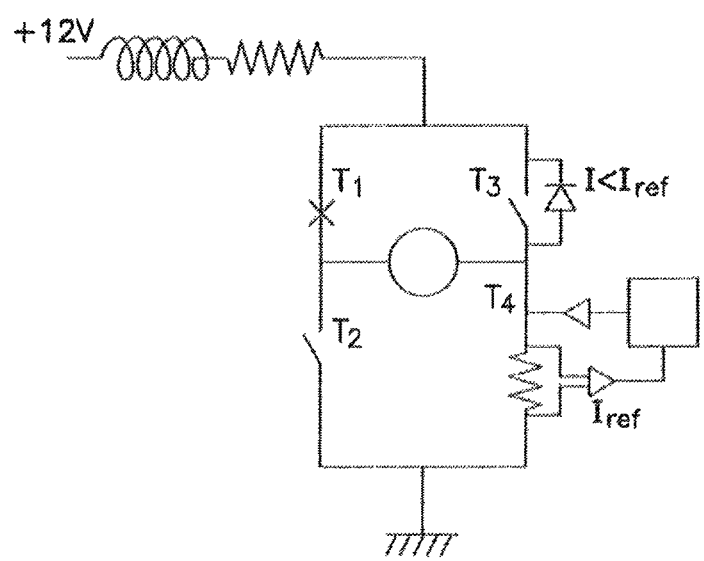
FIG. 3 illustrates the system implementing the method according to the present invention, in one embodiment.

FIG. 3 illustrates the system implementing the method according to an aspect of the present invention, in one embodiment. In contrast to the prior art solution shown in FIG. 2, in the event of detection of a current having an excessively high magnitude, termed 'overcurrent', the transistors are not all turned off at the same time. To this end, detection is awaited, on the transistors opposite the first transistor, of the discharge of the accumulated output power.

Thus, the method according to an aspect of the present invention makes it possible to eliminate or very greatly reduce freewheeling diode injection in the event of detection of a current having an excessively high magnitude, termed 'overcurrent', or of a thermal phenomenon outlined above.

The method according to an aspect of the present invention makes it possible to implement a semiconductor process with low immunity to substrate injection.

The method according to an aspect of the present invention also makes it possible to reduce phenomena, termed 'overshoot', of the supply voltage, and therefore to reduce the decoupling capacitances.

An aspect of the present invention is applicable to all types of circuits having 'high sides' or circuits having a plurality of MOSs with freewheeling diode phases.

The invention is described above by way of example. It is understood that those skilled in the art are able to produce various variants of the invention without however departing from the scope of the patent.

The invention claimed is:

1. A method for limiting the current in an 'H-bridge' device including a plurality of transistors (T1, T2, T3, T4), the method comprising:

detecting a failure on one transistor from among said plurality of transistors;

turning off said transistor on which a failure has been detected;

after said transistor is turned off, detecting, on the transistors opposite said transistor, the discharge of the accumulated output power; and turning off the other transistors of said plurality of transistors.

2. The method as claimed in claim 1, wherein said failure is linked to a current having an excessively high magnitude.

3. The method as claimed in claim 1, wherein said failure is linked to a thermal phenomenon.

4. The method as claimed in claim 1, wherein said detection, on the transistors opposite said transistor, of the discharge of the accumulated output power is performed by a current detector on the opposite transistors.

5. The method as claimed in claim 1, wherein said detection, on the transistors opposite said transistor, of the discharge of the accumulated output power is performed by a voltage detector on the opposite transistors.

6. A system for limiting the current in an 'H-bridge' device including a plurality of transistors (T1, T2, T3, T4), comprising means for:

detecting a failure on one transistor from among said plurality of transistors;

turning off said transistor on which a failure has been detected;

after said transistor is turned off, detecting, on the transistors opposite said transistor, the discharge of the accumulated output power; and turning off the other transistors of said plurality of transistors.

7. The method as claimed in claim 2, wherein said detection, on the transistors opposite said transistor, of the discharge of the accumulated output power is performed by a current detector on the opposite transistors.

8. The method as claimed in claim 3, wherein said detection, on the transistors opposite said transistor, of the discharge of the accumulated output power is performed by a current detector on the opposite transistors.

9. The method as claimed in claim 2, wherein said detection, on the transistors opposite said transistor, of the discharge of the accumulated output power is performed by a voltage detector on the opposite transistors.

10. The method as claimed in claim 3, wherein said detection, on the transistors opposite said transistor, of the discharge of the accumulated output power is performed by a voltage detector on the opposite transistors.

11. A method for limiting the current in an 'H-bridge' device including a plurality of transistors (T1, T2, T3, T4), the method comprising:

detecting a failure on a transistor from among said plurality of transistors;

turning off said transistor on which a failure has been detected, while maintaining other transistors of said plurality of transistors ON;

detecting, on the other transistors of said plurality of transistors, the discharge of the accumulated output power; and in response to detecting the discharge, turning off the other transistors of said plurality of transistors.

* * * * *